(No Model.)
J. A. TURNBULL.
WASHER.
No. 440,870. Patented Nov. 18, 1890.
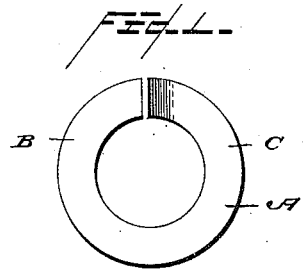
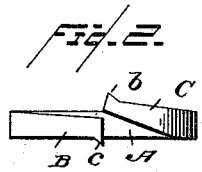
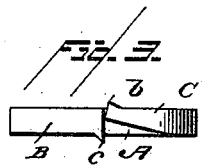
Witnesses:
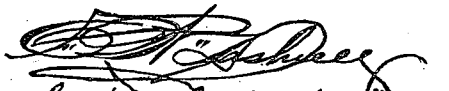
Inventor:
Jas. A. Turnbull
By,
Attorney.

UNITED STATES PATENT OFFICE.

JAMES A. TURNBULL, OF NEWARK, NEW JERSEY.

WASHER.

SPECIFICATION forming part of Letters Patent No. 440,870, dated November 18, 1890.

Application filed April 30, 1890. Serial No. 350,013. (No model.)

*To all whom it may concern:*

Be it known that I, JAMES A. TURNBULL, a citizen of the United States, residing at Newark, in the county of Essex and State of New Jersey, have invented certain new and useful Improvements in Washers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to washers for bolts and nuts of every description; and the object is to provide a washer that will retain its position on the bolt and nut, and to this end I provide the ordinary split washer with tapering ends terminating each with a right-angled spur. One of said ends may be of a greater taper than the other—that is to say, one end may be thicker than the other, but both being provided with spurs, as will be hereinafter more fully described, and particularly pointed out in the claims.

In the drawings the same letters of reference indicate like parts of the invention.

Figure 1 is a plan view of my improved washer, and Figs. 2 and 3 are side views of the same.

A is the washer proper, and is preferably constructed of spring-steel properly tempered, of uniform thickness in cross-section for about two-thirds or three-quarters of its circumference.

The free ends B and C are provided with integral spurs $b$ and $c$, the spur $c$ being preferably quite acute in its angle, while the spur $b$ is considerably more obtuse, which form allows the nut to rotate with comparative ease and freedom over the spur while being screwed on.

In Fig. 2 the free ends are slightly tapered, so as to give them sufficient elasticity when tightly compressed and to provide for their action when made in the helical form, as shown in said figure, while in Fig. 3 the form is a true plane, with the exception of the tapered end, and the spurs, which project in opposite directions above and below the plane. The sharp spurs are arranged at right angles to the ends of the washer-prongs, so that a direct-acting engagement with the adjoining surface is secured, thus insuring a quick, positive, and effective locking of the parts in contact.

The tapering of the ends of the washer-prongs adapts it for use in all places where close work is to be done—that is, in all places where the parts to be secured are confined to a limited space. These two features—the sharpened spurs at right angles to the washer and the tapered prongs—are embodied in my construction of washer and used jointly to secure a better result than has been before secured in any construction known to me. These spurs, being tempered and sharpened, will readily bite into the softer metal of the nut and adjoining surface and form a lock, which can only be released at the expense of the nut itself.

Having thus described my invention, what I claim as new and useful, and desire to secure by Letters Patent of the United States, is—

1. As a new article of manufacture, a spring-steel split washer having a tapering end provided with a spur, as specified.

2. As a new article of manufacture, a spring-steel split washer having tapering ends provided with angular spurs, as specified.

In testimony whereof I affix my signature in presence of two witnesses.

JAMES A. TURNBULL.

Witnesses:
H. M. PETERS,
H. J. ENNIS.